(12) United States Patent
Zähe

(10) Patent No.: US 12,116,969 B2
(45) Date of Patent: Oct. 15, 2024

(54) THREE-PORT PROPORTIONAL FLOW CONTROL VALVE WITH AN INTEGRATED TURBINE FOR FLOW RATE SENSING

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 403 days.

(21) Appl. No.: 17/712,565

(22) Filed: Apr. 4, 2022

(65) Prior Publication Data
US 2022/0397439 A1  Dec. 15, 2022

Related U.S. Application Data

(60) Provisional application No. 63/209,441, filed on Jun. 11, 2021.

(51) Int. Cl.
| | |
|---|---|
| *F15B 21/14* | (2006.01) |
| *F03B 13/00* | (2006.01) |
| *F15B 13/02* | (2006.01) |
| *F15B 13/04* | (2006.01) |
| *F15B 15/00* | (2006.01) |
| *F16K 11/07* | (2006.01) |
| *F16K 17/04* | (2006.01) |
| *F16K 37/00* | (2006.01) |
| *G01F 1/115* | (2006.01) |

(Continued)

(52) U.S. Cl.
CPC .............. *F03B 13/00* (2013.01); *F15B 13/02* (2013.01); *F15B 13/026* (2013.01); *F15B 13/0402* (2013.01); *F15B 15/00* (2013.01); *F15B 21/14* (2013.01); *F16K 11/07* (2013.01); *F16K 17/048* (2013.01); *F16K 37/005* (2013.01); *G01F 1/115* (2013.01); *G01F 1/1155* (2013.01); *G01F 15/005* (2013.01); *G01F 15/066* (2013.01); *H02K 7/1823* (2013.01); *F05B 2220/706* (2013.01)

(58) Field of Classification Search
CPC .............................. F15B 21/14; F15B 13/0402
See application file for complete search history.

(56) References Cited

U.S. PATENT DOCUMENTS

| | | |
|---|---|---|
| 3,701,277 A | 10/1972 | McMahon et al. |
| 4,566,317 A | 1/1986 | Shakra |

(Continued)

FOREIGN PATENT DOCUMENTS

CN  101379330 B  9/2012

*Primary Examiner* — Herbert K Roberts
(74) *Attorney, Agent, or Firm* — McDonnell Boehnen Hulbert & Berghoff LLP

(57) ABSTRACT

An example valve includes: a plurality of ports comprising: a first port, a second port, and a third port; a spool configured to block fluid flow from the first port to the third port while allowing fluid flow from the third port to the second port when the valve is in an unactuated state; a spring applying a biasing force on the spool in a proximal direction, wherein when the valve is actuated, the spool moves in a distal direction against the spring, thereby allowing fluid flow from the first port to the third port while blocking fluid flow from the third port to the second port; and a turbine configured to rotate as fluid flows from the first port to the third port when the valve is in an actuated state.

20 Claims, 4 Drawing Sheets

(51) Int. Cl.
    *G01F 15/00*     (2006.01)
    *G01F 15/06*     (2022.01)
    *H02K 7/18*     (2006.01)

(56) References Cited

U.S. PATENT DOCUMENTS

| | | |
|---|---|---|
| 6,789,434 B2 | 9/2004 | Peterson |
| 7,624,632 B1 | 12/2009 | Hoyle et al. |
| 10,626,892 B1* | 4/2020 | Zähe .................. F15B 13/0433 |
| 10,648,488 B1* | 5/2020 | Zähe .................. F15B 11/042 |
| 10,683,879 B1* | 6/2020 | Zähe .................. F15B 13/0442 |
| 10,774,849 B1* | 9/2020 | Zähe ...................... F16K 15/18 |
| 10,794,510 B1* | 10/2020 | Pena ...................... F16K 17/105 |
| 11,319,870 B1* | 5/2022 | Ezra ........................ F02B 37/24 |
| 2003/0140975 A1* | 7/2003 | Bento .................... F15B 21/14 |
| | | 137/625.64 |
| 2007/0151614 A1* | 7/2007 | Dayton ................. F16K 27/048 |
| | | 137/625.65 |
| 2010/0054909 A1* | 3/2010 | Nishiyama ............ F15B 15/204 |
| | | 60/605.1 |
| 2012/0325016 A1 | 12/2012 | Peled |
| 2013/0287601 A1* | 10/2013 | Mori .................... F15B 11/165 |
| | | 417/364 |
| 2015/0198241 A1* | 7/2015 | Barngrover ......... F16H 61/0251 |
| | | 137/625.65 |
| 2018/0334784 A1* | 11/2018 | Fukuda .................. F15B 21/14 |
| 2019/0271993 A1* | 9/2019 | Reynolds .............. E02F 9/2267 |
| 2020/0056631 A1* | 2/2020 | Pena ............... F15B 11/003 |
| 2020/0088217 A1* | 3/2020 | Zähe .................... F16K 31/406 |
| 2021/0048118 A1* | 2/2021 | Lampton ............... F15B 13/022 |
| 2021/0123463 A1* | 4/2021 | Andrews ............ B01D 35/1573 |
| 2021/0310838 A1* | 10/2021 | Dietel .................. G01F 15/005 |

* cited by examiner

THREE-PORT PROPORTIONAL FLOW CONTROL VALVE WITH AN INTEGRATED TURBINE FOR FLOW RATE SENSING

CROSS REFERENCE TO RELATED APPLICATION

The present application claims priority to U.S. Provisional patent application Ser. No. 63/209,441, filed on Jun. 11, 2021, and entitled "Pressure-Compensated Flow Control Valve with an Integrated Turbine for Energy Harvesting or Flow Rate Sensing," the entire contents of which are herein incorporated by reference as if fully set forth in this description.

BACKGROUND

A hydraulic valve directs the flow of a liquid medium, usually oil, through a hydraulic system. The direction of the oil flow is determined by the position of a movable element such as a spool, piston, or poppet. The size of the valve may be determined by the maximum flow of the hydraulic system through the valve and the maximum system pressure.

In some applications, it may be desirable to measure or sense the fluid flow rate through the valve. This may be accomplished by measuring the stroke of the movable element (e.g., a s pool, piston, or poppet), but such measurement might not be accurately correlated with the flow rate under some conditions and might not be feasible in some applications.

A separate flow meter may be added to the system, downstream or upstream from the valve. The hydraulic line between the valve and the flow meter has a capacitance, and such capacitance may cause a delay in the flow measurement by the flow meter. As such, it may be desirable to integrate flow sensing capability into the valve to reduce or eliminate such capacitance. It is with respect to these and other considerations that the disclosure made herein is presented.

SUMMARY

The present disclosure describes implementations that relate to a three-port proportional flow control valve with an integrated turbine for flow rate sensing.

In a first example implementation, the present disclosure describes a valve. The valve includes: a plurality of ports comprising: a first port, a second port, and a third port; a spool configured to block fluid flow from the first port to the third port while allowing fluid flow from the third port to the second port when the valve is in an unactuated state; a spring applying a biasing force on the spool in a proximal direction, wherein when the valve is actuated, the spool moves in a distal direction against the spring, thereby allowing fluid flow from the first port to the third port while blocking fluid flow from the third port to the second port; and a turbine configured to rotate as fluid flows from the first port to the third port when the valve is in an actuated state.

In a second example implementation, the present disclosure describes a hydraulic system. The hydraulic system includes: an actuator comprising a first chamber and a second chamber; a source of fluid flow; a fluid reservoir; a counterbalance valve configured to control flow of fluid discharged from the second chamber to the fluid reservoir, wherein the counterbalance valve comprises a pilot port; and a valve. The valve includes: a plurality of ports comprising: (i) a first port fluidly-coupled to the source of fluid flow, (ii) a second port fluidly-coupled to the fluid reservoir, and (iii) a third port fluidly-coupled to the first chamber of the actuator via a fluid line, wherein the pilot port of the counterbalance valve is fluidly-coupled to the fluid line; a spool configured to block fluid flow from the first port to the third port while allowing fluid flow from the third port to the second port to drain the pilot port of the counterbalance valve to the fluid reservoir when the valve is in an unactuated state; a spring applying a biasing force on the spool in a proximal direction, wherein when the valve is actuated, the spool moves in a distal direction against the spring, thereby allowing fluid flow from the first port to the third port, then to the first chamber of the actuator, while blocking fluid flow from the third port to the second port, and wherein a pilot fluid signal is provided from the fluid line to the pilot port to open the counterbalance valve and allow fluid discharged from the second chamber to flow to the fluid reservoir; and a turbine configured to rotate as fluid flows from the first port to the third port when the valve is in an actuated state.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

An example flow control valve includes three ports. The valve can have a spool that, in an unactuated state, blocks a throttling opening to preclude fluid flow from a first port to a third port of the valve, while allowing fluid flow from the third port to the second port. The valve can have an actuation mechanism such as a manual actuator, a solenoid actuator, or an electric motor, and when the valve is actuated, the spool moves, thereby gradually exposing the opening and allowing fluid flow from the first port to the third port.

In example disclosed valves, a turbine is integrated within the valve. The term "turbine" is used herein to indicate rotary mechanical device including a rotary component such as an impeller, for example, which extracts energy from a fluid flow. As fluid flows across the turbine, fluid rotates the turbine.

In an example, the turbine can be used for flow rate sensing. Particularly, the valve can be configured to include a Hall Effect sensor with the turbine. The Hall Effect sensor may generate an electric signal indicative of rotational speed of the turbine and a count of the revolutions of the turbine as fluid flows across the turbine. Such signal can be used to determine the fluid flow rate across the valve. As such, the valve can operate as a flow meter in addition to throttling fluid from one port to another.

Figure 1:
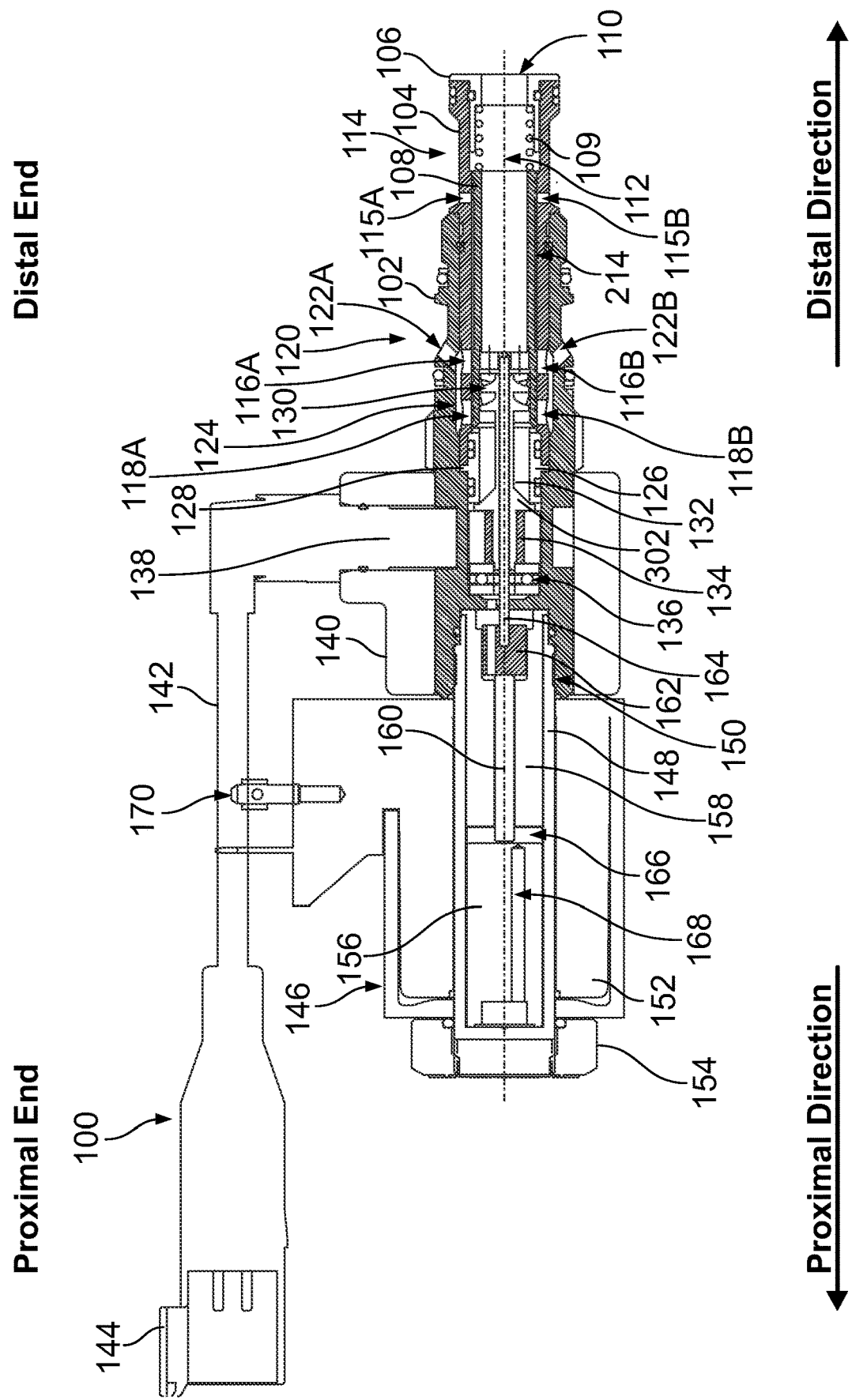
FIG. 1 illustrates a cross-sectional side view of a valve with an integrated flow rate sensor, in accordance with an example implementation.

FIG. 1 illustrates a cross-sectional side view of a valve 100 with an integrated flow rate sensor, in accordance with an example implementation. FIG. 1 shows the valve 100 in an unactuated state. The valve 100 may be inserted or screwed into a manifold having ports corresponding to ports of the valve 100 described below, and the manifold can fluidly couple the valve 100 to other components of a hydraulic system, such as the hydraulic system 600 described below.

The valve 100 includes a housing 102 having a longitudinal cylindrical cavity therein. The longitudinal cylindrical cavity of the housing 102 is configured to house components of the valve 100. The valve 100 further includes a sleeve 104 fixedly-disposed partially within the longitudinal cylindrical cavity of the housing 102. The sleeve 104 has a respective longitudinal cylindrical cavity therein.

The valve 100 includes a nose piece 106 coupled to the sleeve 104 and disposed at a distal end of the sleeve 104. The nose piece 106 is ring-shaped, and thus allows fluid flow therethrough.

The valve 100 also includes a spool 108 disposed within the longitudinal cylindrical cavity of the housing 102. The spool 108 can also be referred to as a piston. The spool 108 is slidably-accommodated within the sleeve 104. As such, the spool 108 is axially-movable within the sleeve 104. The term "slidably accommodated" is used throughout herein to indicate that a first component (e.g., the spool 108) is positioned relative to a second component (e.g., the sleeve 104) with sufficient clearance therebetween, enabling movement of the first component relative to the second component in the proximal and distal directions. As such, the first component (e.g., the spool 108) is not stationary, locked, or fixedly disposed in the valve 100, but is rather allowed to move relative to the second component (e.g., the sleeve 104).

Figure 2:
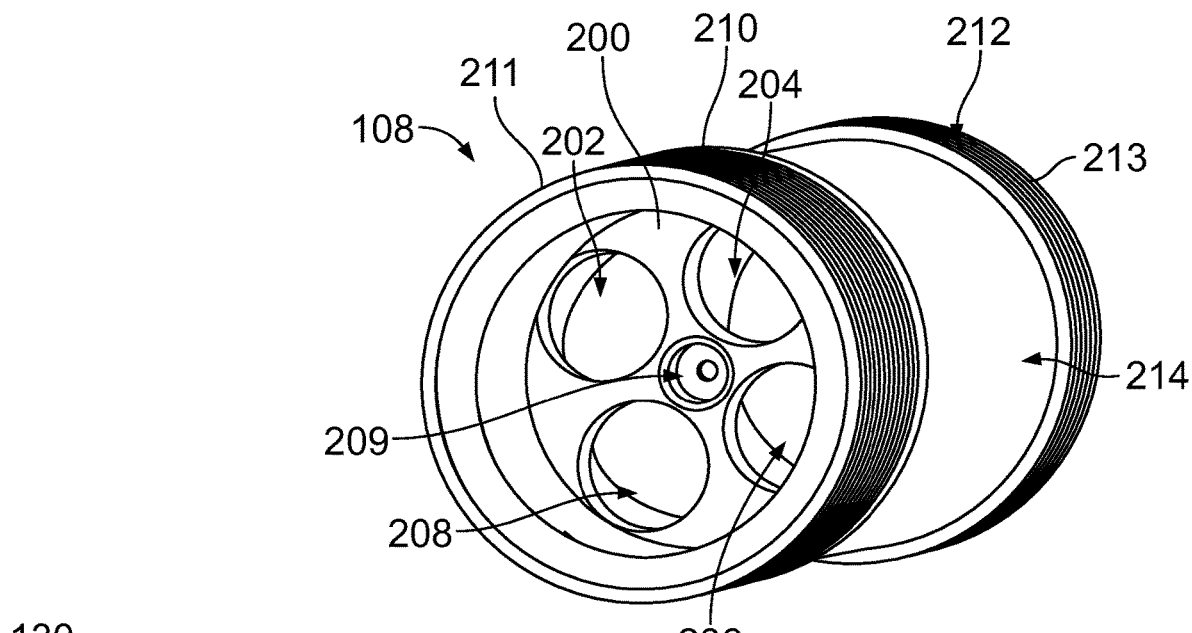
FIG. 2 illustrates a perspective view of a spool of the valve of FIG. 1, in accordance with an example implementation.

FIG. 2 illustrates a perspective view of the spool 108, in accordance with an example implementation. As shown, the spool 108 has an internal web 200 in which a plurality of longitudinal through-holes are formed in a circular array. For example, through-hole 202, through-hole 204, through-hole 206, and through-hole 208 are formed in the internal web 200. The through-holes 202-208 allow fluid flow through the spool 108. The spool 108 further includes a cavity 209 formed at a center of the internal web 200.

The spool 108 further includes a plurality of balance annular grooves 210 at an enlarged-diameter distal end 211 of the spool 108, and also has a plurality of balance annular grooves 212 at an enlarged-diameter proximal end 213 of the spool 108. During operation of the valve 100, the balance annular grooves 210, 212 are filled with fluid for lubrication and facilitation of axial movement of the spool 108. Further, between the enlarged-diameter distal end 211 and the enlarged-diameter proximal end 213, an annular groove 214 is formed about the spool 108. The annular groove 214 is formed as a recess or depression in the exterior surface of the spool 108.

Referring back to FIG. 1, the valve 100 includes a spring 109 disposed between a distal end of the spool 108 and an interior shoulder formed in the nose piece 106. The nose piece 106 is fixedly-coupled to the sleeve 104, and therefore the spring 109 applies a biasing force on the spool 108 in the proximal direction.

The valve 100 includes a first port 110 at a distal end of the sleeve 104 where fluid is allowed to flow through the nose piece 106. As shown in FIG. 1, the sleeve 104 and the spool 108 are generally cylindrical and are a hollow, and a main chamber 112 is formed within the sleeve 104 and the spool 108, where the main chamber 112 is fluidly-coupled to the first port 110.

The valve 100 further includes a second port 114. The second port 114 can include one or more cross-holes, such as cross-holes 115A, 115B, disposed in the sleeve 104 in a circumferential array about the sleeve 104. The cross-holes 115A, 115B are fluidly-coupled to the annular groove 214 of the spool 108 as shown in FIG. 1. The term "fluidly-coupled" is used throughout herein to indicate that fluid can flow or be communicated between two fluid passages, chambers, ports, or openings.

The cross-holes 115A, 115B are a first set of cross-holes formed in the sleeve 104. The sleeve 104 further includes two more sets of cross-holes at a proximal end of the sleeve 104 disposed in a circumferential array about the sleeve 104. The second set of cross-holes includes cross-hole 116A and cross-hole 116B. The third set of cross-holes can be referred to as throttling cross-holes and include throttling cross-hole 118A and throttling cross-hole 118B. The first set of cross-holes 115A, 115B, the second set of cross-holes 116A, 116B, and the third set of throttling cross-holes 118A, 118B are axially-spaced from each other along a length of the sleeve 104. In the position shown in FIG. 1, the spool 108 blocks the throttling cross-holes 118A, 118B. However, in the position shown in FIG. 1, the annular groove 214 of the spool 108 fluidly couples the cross-holes 116A, 116B to the cross-holes 115A, 115B.

The term "block" is used throughout herein to indicate substantially preventing fluid flow except for minimal or leakage flow of drops per minute, for example. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

The valve 100 further includes a third port 120. The third port 120 includes a plurality of cross-holes formed in a circumferential array about the housing 102 such as cross-hole 122A and cross-hole 122B. The third port 120 is fluidly-coupled via the cross-holes 122A, 122B to the cross-holes 116A, 116B and the throttling cross-holes 118A, 118B via an annular chamber 124 formed between the sleeve 104 and the housing 102.

In the unactuated state of the valve 100 shown in FIG. 1, the third port 120 is fluidly coupled to the second port 114. Particularly, fluid at the third port 120 can be drained through the cross-holes 122A, 122B, through the annular chamber 124, the cross-holes 116A, 116B, the annular groove 214 of the spool 108, and through the cross-holes 115A, 115B to the second port 114.

The valve 100 further includes a seal carrier 126 fixedly-disposed within the housing 102. Particularly, the seal carrier 126 has a flange 128 that is interposed between a proximal end of the sleeve 104 and an interior shoulder formed in the housing 102.

The valve 100 further includes a flow rate meter or flow rate sensor integrated therein. Particularly, the valve 100 includes a turbine 130 that includes a turbine shaft 132. The turbine 130 is disposed partially within the spool 108.

Figure 3:
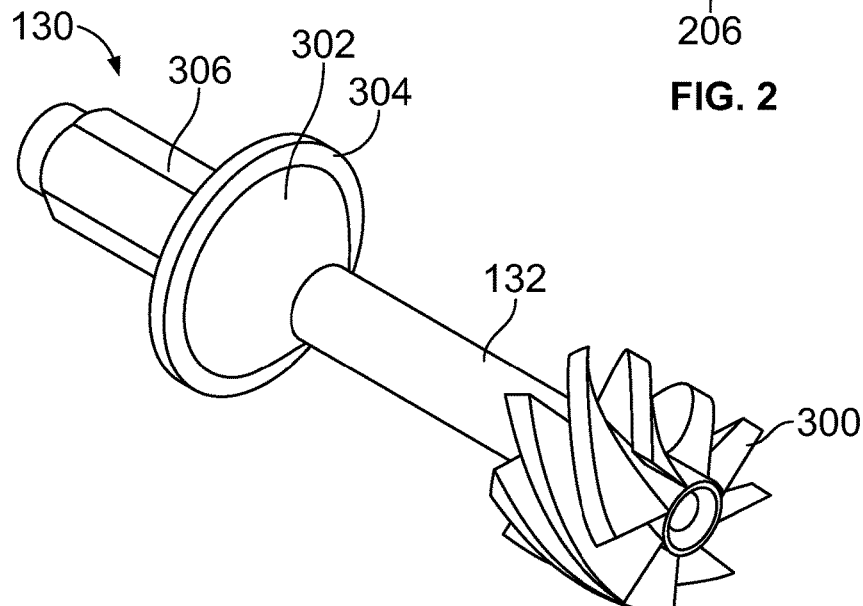
FIG. 3 illustrates a perspective view of a turbine of the valve of FIG. 1, in accordance with an example implementation.

FIG. 3 illustrates a perspective view of the turbine 130, in accordance with an example implementation. The turbine 130 has an impeller 300 mounted to, or integrated with, the turbine shaft 132. The impeller 300 includes fins or blades that rotate as fluid passes across the impeller 300.

The turbine shaft 132 can have an enlarged tapered section 302, which has a flanged portion 304 that rests against the proximal end of the seal carrier 126 (see FIG. 1). This way, the turbine 130 is precluded from moving in the distal direction. Further, a shaft portion 306 of the turbine shaft 132 can have a hexagonal exterior surface.

Figure 4:
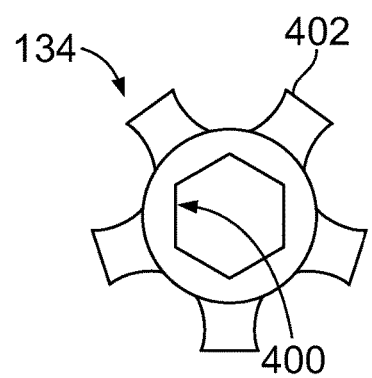
FIG. 4 illustrates a front view of a wheel of the valve of FIG. 1, in accordance with an example implementation.

Referring back to FIG. 1, the valve 100 further includes a wheel 134 mounted to the turbine shaft 132 and rotatable therewith. FIG. 4 illustrates a front view of the wheel 134, in accordance with an example implementation. As depicted, the wheel 134 is hollow, and has an hexagonal interior surface 400 that facilitates mounting the wheel 134 to the shaft portion 306 (which has a corresponding hexagonal exterior surface) of the turbine shaft 132. This way, the wheel 134 rotates with the turbine shaft 132 and the impeller 300. The wheel 134 has several teeth, blades, or fins, such as fin 402, with channels therebetween to allow fluid flow through the wheel 134.

Referring back to FIG. 1, the valve 100 further includes a thrust bearing 136. The wheel 134 is interposed and is retained-axially between the enlarged tapered section 302 of the turbine shaft 132 and the distal race of the thrust bearing 136. The thrust bearing 136 in turn is axially-retained between the proximal end of the wheel 134 and a shoulder formed in the housing 102 as shown in FIG. 1.

The thrust bearing 136 can be any type of thrust bearings such as a thrust ball bearing, a cylindrical thrust roller bearing, a tapered roller thrust bearing, a spherical roller thrust bearing, a fluid bearing, a magnetic bearing, or a needle bearing. For example, as depicted in FIG. 1, the thrust bearing 136 can have a distal race, a proximal race, and a plurality of balls retained in a nylon cage. The distal race rotates with the wheel 134 (which rotates with the turbine 130), whereas the proximal race remains stationary. This way, the thrust bearing 136 is configured to support axial loads to which the turbine 130 is subjected while facilitating rotary motion of the turbine 130.

The valve 100 further includes a Hall Effect sensor 138 disposed, at least partially, within a wall of the housing 102 adjacent the wheel 134. The Hall Effect sensor 138 is retained to the housing 102 via a sensor retainer 140.

The Hall Effect sensor 138 is configured to sense the rotations of the wheel 134, which are the same as the rotations of the turbine 130. Particularly, the Hall Effect sensor 138 is configured to count the revolutions of the wheel 134 in a predetermined period of time.

In an example, the blades or fins (e.g., the fin 402) the wheel 134 can have magnets or magnetic material embedded therein. In another example, the fins of the wheel 134 are made from a magnetic material. The Hall Effect sensor 138 then senses the rotations of the wheel 134 (i.e., counts the revolutions of the wheel 134) by way of interacting with the magnetic material in the wheel 134. In other words, the Hall Effect sensor 138 detects changes in a magnetic field as the wheel 134 rotates. The Hall Effect sensor 138 then communicates a signal indicative of the counted revolutions via a cable 142 and connector 144 to an electronic processor or controller (e.g., the controller 642 in FIG. 6) that determines the fluid flow rate through the valve 100 based on the signal. In another example, the turbine shaft 132 or the impeller 300, rather than the wheel 134, can include magnetic material embedded therein or can be made of magnetic material, and the Hall Effect sensor 138 interacts with the magnetic material in the turbine shaft 132 or the impeller 300 to count its revolutions.

In another example, rather than the wheel 134 or the turbine 130, the Hall Effect sensor 138 may include a magnet therein. The magnet generates a magnetic field. Rotation of the wheel 134 disturbs such magnetic field, and the Hall Effect sensor 138 can determine the number of revolutions based on detecting such disturbance in the magnetic field.

The accuracy of the flow rate meter may depend on the flow profile of the fluid upstream of the turbine 130 (i.e., fluid in the main chamber 112). Upstream disturbances impact the flow profile of the flow stream, which in turn affects flow meter accuracy. The spool 108 may operate as a flow straightener as fluid is directed to flow through the through-holes 202-208, which are located upstream of the turbine 130. This way, upstream disturbances may be reduced.

The valve 100 includes a solenoid actuator 146 configured to actuate the spool 108. The solenoid actuator 146 is depicted in FIG. 1 as a push-type solenoid actuator as an example for illustration. However, it should be understood that pull-type solenoid actuators, rotary actuators, manual actuators, hydraulic/pneumatic actuators could be used.

The solenoid actuator 146 includes a solenoid tube 148 disposed within, and received at, a proximal end of the housing 102. For example, the solenoid tube 148 can be threaded to the housing 102 via threads 150.

The solenoid actuator 146 further includes a solenoid coil 152 disposed about an exterior surface of the solenoid tube 148 between a nut 154 and the proximal end face of the housing 102. The solenoid tube 148 is configured to house a plunger or armature 156 that is axially-movable therein.

The solenoid tube 148 further houses a pole piece 158 coaxial with the armature 156 and fixedly-disposed within the solenoid tube 148. For example, the pole piece 158 can have a flanged distal end that is interposed between a distal end of the solenoid tube 148 and a shoulder formed by the interior surface of the housing 102. This way, the pole piece 158 is secured in-place.

The pole piece 158 further defines a longitudinal channel therein, and a push pin 160 is disposed in such longitudinal channel of the pole piece 158. The longitudinal channel of the pole piece 158 has an enlarged section that houses a cap 162. The cap 162 is coupled to a rod 164 that is disposed through the turbine 130 as depicted in FIG. 1, and the rod 164 is also coupled to the spool 108. Particularly, a distal end of the rod 164 is disposed in the cavity 209 of the spool 108 (see FIG. 2). This way, if the cap 162 moves axially (e.g., in the distal direction), the rod 164 move therewith, thereby also moving the spool 108 in the distal direction.

The rod 164 is mounted through the turbine 130 such that the rod 164 can move axially relative to the turbine 130, while the turbine 130 remains stationary. The rod 164 can be used to center the turbine 130, the thrust bearing 136, and the spool 108 within the housing 102 during assembly of the valve 100.

The push pin 160 is disposed between the proximal end of the cap 162 and the armature 156. Further, the pole piece 158 is separated from the armature 156 by an airgap 166 traversed by the push pin 160 when the valve 100 is in the unactuated state shown in FIG. 1. The pole piece 158 can be composed of a material of high magnetic permeability.

Fluid from the first port 110 is communicated through the spool 108, the turbine 130, and unsealed spaces in the valve 100 to within the solenoid tube 148. Fluid is further communicated through a longitudinal channel in the cap 162, through longitudinal channel of the pole piece 158 in which the push pin 160 is disposed and the airgap 166, then through an armature channel 168 to a back (proximal) end of the armature 156. This way, fluid from the first port 110 fills the solenoid tube 148, and thus the armature 156, as well as the push pin 160, are pressure-balanced.

The valve 100 is configured to operate in at least two modes of operation based on whether the solenoid actuator 146 is activated (i.e., whether the solenoid coil 152 is energized). FIG. 1 depicts the valve 100 in the unactuated state, i.e., when the solenoid coil 152 is de-energized. In this unactuated state, as mentioned above, the third port 120 is fluidly-coupled to the second port 114, such that fluid at the third port 120 can be drained or can flow to the second port 114.

The valve 100 can also operate in an actuated state in which the solenoid coil 152 is energized by electric power, e.g., an electric current provided via an electric connector 170. In the cross-sectional side view of FIG. 1, the electric connector 170 appears to be intersecting with the cable 142. However, they are disposed in different plane and do not interact. In the actuated state, the valve 100 allows fluid flow from the first port 110 to the third port 120, whereas the second port 114 is blocked.

Figure 5:
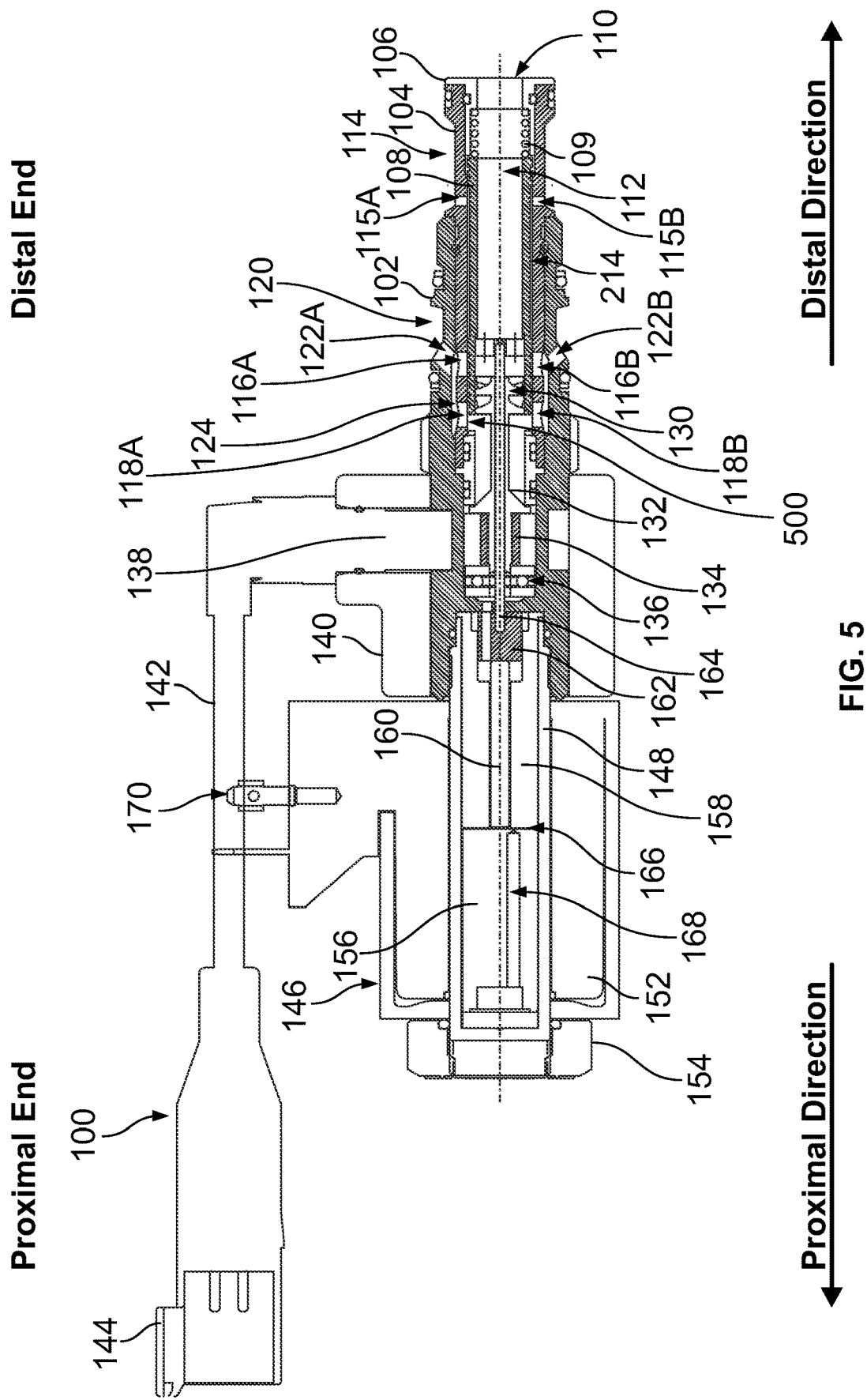
FIG. 5 illustrates a cross-sectional side view of the valve of FIG. 1 operating in an actuated state, in accordance with an example implementation.

FIG. 5 illustrates a cross-sectional side view of the valve 100 operating in an actuated state allowing fluid flow from the first port 110 to the third port 120, in accordance with an example implementation. In this mode of operation of the valve 100, the first port 110 is configured as an inlet port that is fluidly-coupled to a source of fluid (e.g., a pump, an accumulator, a hydraulic actuator discharging fluid, etc.) capable of providing fluid at high pressure levels (e.g., 1000-5000 pounds per square inch (psi)). Fluid flow is then metered or throttled as it flows to the third port 120.

When an electric current is provided through the windings of the solenoid coil 152, a magnetic field is generated. The pole piece 158 directs the magnetic field through the airgap 166 toward the armature 156, which is movable and is attracted toward the pole piece 158. In other words, when an electric current is applied to the solenoid coil 152, the generated magnetic field forms a north and south pole in the pole piece 158 and the armature 156, and therefore the pole piece 158 and the armature 156 are attracted to each other. Because the pole piece 158 is fixed while the armature 156 is movable, the armature 156 is attracted and is movable across the airgap 166 toward the pole piece 158. Thus, when the electric current or voltage is provided to the solenoid coil 152, a solenoid force is generated and is applied to the armature 156, thereby attracting the armature 156 toward the pole piece 158.

As the armature 156 is attracted toward the pole piece 158, the armature 156 applies the solenoid force on the push pin 160. The armature 156 thus pushes the push pin 160 in the distal direction (e.g., to the right in FIGS. 1, 5), causing the push pin 160 to move axially in the distal direction, thereby applying a force on the cap 162, the rod 164, and the spool 108 in the distal direction.

When the solenoid force overcomes the biasing force of the spring 109, friction forces, and fluid forces acting on the spool 108, the rod 164 can cause the spool 108 to move axially in the distal direction as shown in FIG. 5 relative to FIG. 1. The axial distance that the armature 156, the push pin 160, the cap 162, the rod 164, and the spool 108 move is based on a magnitude of electric actuation signal (e.g., electric current) provided to the solenoid coil 152 (i.e., based on a magnitude of the solenoid force generated by the electric signal).

As the spool 108 moves in the distal direction, the spring 109 is compressed and its biasing force increases. The spool 108 can move in the distal direction to a particular axial position at which force equilibrium between forces acting on the spool 108 is achieved. Based on the magnitude of the solenoid force, the spool 108 can move a sufficient axial distance to an axial position at which the proximal end of the annular groove 214 moves past distal edges of the cross-holes 116A, 116B, thereby blocking fluid flow from the third port 120 to the second port 114. Further, the proximal end of the spool 108 moves past the proximal edge of the throttling cross-holes 118A, 118B, thereby forming a throttling variable orifice or throttling flow area 500.

At such axial position, fluid is allowed to flow from the first port 110 through the main chamber 112, through the through-holes 202-208 of the spool 108, across the impeller 300 of the turbine 130, then through the throttling flow area 500, through the annular chamber 124, and through the cross-holes 122A, 122B of the third port 120.

At the same time the valve 100 is providing fluid flow from the first port 110 to the third port 120, the flow rate sensor provides a signal indicative of the fluid flow rate through the valve 100. Particularly, as fluid flows across the impeller 300, the turbine 130 and the wheel 134 rotate. The Hall Effect sensor 138 provides a sensor signal indicative of the count of revolutions of the wheel 134, and such count of revolutions is indicative of the fluid flow rate from the first port 110 to the third port 120.

Thus, the flow rate sensor can confirm that a particular, expected fluid flow rate is flowing through the valve 100. Also, the flow rate sensor monitors the actual flow rate through the valve 100. This can allow the user to meet safety requirements for flow control valves because the signal from the Hall Effect sensor 138 is a more accurate indication of flow rate compared to conventional methods involving measuring linear position or stroke of a spool or movable element, which can be inaccurate due to friction and malfunction issues.

Advantageously, with the configuration of the valve 100, the flow rate sensor is integrated in the valve 100 and there is no need for a separate flow meter to be installed in the system. A separate flow meter may require a separate cavity and plumbing in a hydraulic system or manifold. As such, the configuration of the valve 100 with the integrated flow meter may reduce cost and enhance reliability of the hydraulic system. Also, the flow rate sensor information might not be delayed as in conventional system where there is capacitance between a separate flow rate sensor and the valve.

When the solenoid coil 152 is de-energized (e.g., command signal to the solenoid coil 152 is reduced or removed), the armature 156 is no longer attracted by a magnetic force toward the pole piece 158, and the spring 109 pushes the spool 108 back in the proximal direction. As the spool 108 moves in the proximal direction to return to an unactuated axial position, the throttling cross-holes 118A, 118B can be blocked again, and fluid can be drained from the third port 120 to the second port 114 as described with respect to FIG. 1.

Figure 6:
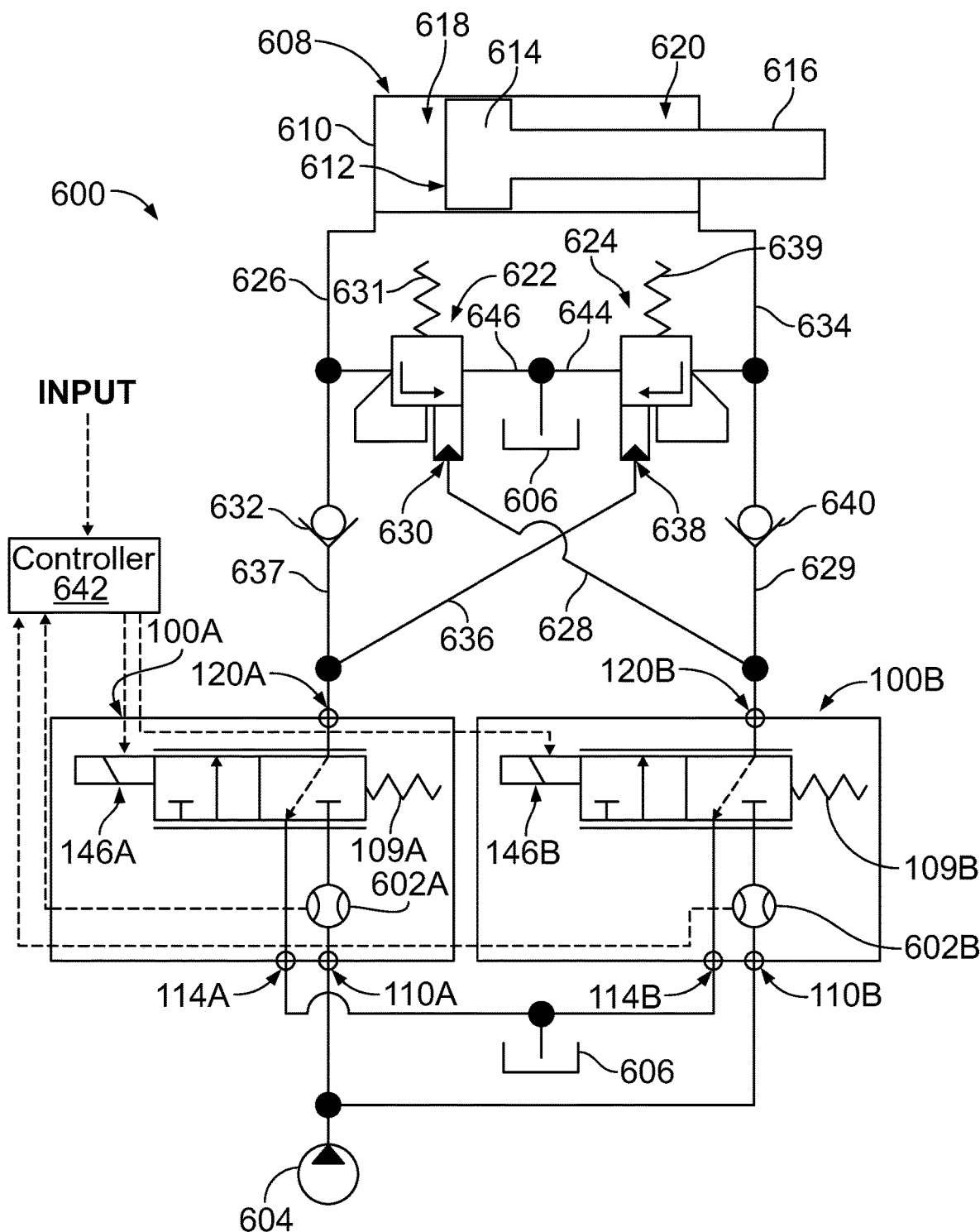
FIG. 6 illustrates a hydraulic system, in accordance with an example implementation.

FIG. 6 illustrates a hydraulic system 600, in accordance with an example implementation. The hydraulic system 600 includes two valves 100A, 100B symbolically represented in FIG. 6. The valves 100A, 100B both represent the valve 100 described above with respect to FIGS. 1-5 and have the same components of the valve 100. Therefore, the components or elements of valves 100A, 100B are designated with the same reference numbers used for the valve 100 in FIGS. 1-5 with an "A" or "B" suffix. The flow rate sensor (i.e., the combination of the turbine 130, the wheel 134, and the Hall Effect sensor 138, etc.) are represented symbolically as flow rate sensor 602A for the valve 100A and as flow rate sensor 602B for the valve 100B.

The hydraulic system 600 includes a source 604 of fluid such as a pump, an accumulator, or another portion of the hydraulic system. The first ports 110A, 110B of the valves 100A, 100B, respectively, are fluidly-coupled to the source 604. The hydraulic system 600 also includes a fluid reservoir 606 that can store fluid at a low pressure (e.g., 0-70 psi). The second ports 114A, 114B of the valves 100A, 100B, respectively, are fluidly-coupled to the fluid reservoir 606. The fluid reservoir 606 is drawn at two different locations in FIG. 6 to reduce visual clutter in the drawing. It should be understood, however, that the hydraulic system 600 can include one fluid reservoir.

In the hydraulic system 600, the valves 100A, 100B can be configured as meter-in valves configured to control fluid flow to chambers of an actuator 608. The actuator 608 includes a cylinder 610 and an actuator piston 612 slidably-accommodated in the cylinder 610. The actuator piston 612 includes a piston head 614 and a piston rod 616 extending from the piston head 614 along a central longitudinal axis direction of the cylinder 610. The piston head 614 divides the inner space of the cylinder 610 into a first chamber 618 and a second chamber 620. A hydraulic cylinder actuator is used herein as an example. Other types of actuators, such as a hydraulic motor, can be used.

The hydraulic system 600 can include a counterbalance valve 622 that controls flow of fluid discharged from the first chamber 618, and also include a counterbalance valve 624 that controls flow of fluid discharged from the second chamber 620. A counterbalance valve is used in the hydraulic system to control an overriding (run-away) or suspended load. For example, if the actuator piston 612 retracts with gravity under load, the counterbalance valve 622 creates backpressure at fluid line 626 that fluidly couples the counterbalance valve 622 to the first chamber 618 to prevent losing control over the load.

In particular, the fluid discharged from the first chamber 618 can open the counterbalance valve 622 only if the load pressure at the first chamber 618 and pressure of a pilot fluid signal received via pilot fluid line 628 (which is coupled to fluid line 629) at a pilot port 630 of the counterbalance valve 622 create enough force to overcome a force of spring 631 of the counterbalance valve 622 to open the counterbalance valve 622 and allow fluid flow therethrough. The counterbalance valve 622 has a check valve 632 that allows free fluid flow into the first chamber 618 when the actuator piston 612 extends (moves to the right in FIG. 6).

Similarly, if the actuator piston 612 extends with gravity under load, the counterbalance valve 624 creates backpressure at fluid line 634 that fluidly couples the counterbalance valve 624 to the second chamber 620 to prevent losing control over the load. In particular, the fluid discharged from the second chamber 620 can open the counterbalance valve 624 only if the load pressure at the second chamber 620 and pressure of a pilot fluid signal received via pilot fluid line 636 (which is coupled to fluid line 637) at a pilot port 638 of the counterbalance valve 624 create enough force to overcome a force of spring 639 of the counterbalance valve 624 to open the counterbalance valve 624 and allow fluid flow therethrough. The counterbalance valve 624 has a check valve 640 that allows free fluid flow into the second chamber 620 when the actuator piston 612 retracts (moves to the left in FIG. 6).

The third port 120A of the valve 100A is fluidly-coupled to the first chamber 618 via the fluid line 637, the check valve 632, and the fluid line 626. Similarly, the third port 120B of the valve 100B is fluidly-coupled to the second chamber 620 via the fluid line 629, the check valve 640, and the fluid line 634.

The hydraulic system 600 further includes a controller 642. The controller 642 can include one or more processors or microprocessors and may include data storage (e.g., memory, transitory computer-readable medium, non-transitory computer-readable medium, etc.). The data storage may have stored thereon instructions that, when executed by the one or more processors of the controller 642, cause the controller 642 to perform operations described herein. Signal lines to and from the controller 642 are depicted as dashed lines in FIG. 6. The controller 642 can receive input or input information comprising input commands indicating a target flow rate or speed for the actuator piston 612 and sensor information via signals from the flow rate sensors 602A, 602B. In response, the controller 642 provides electrical actuation signals to various components of the hydraulic system 600 such as the solenoid actuator 146A of the valve 100A or solenoid actuator 146B of the valve 100B.

For example, the controller 642 can receive a command or input information requesting extending the actuator piston 612 at a particular speed. To achieve the particular speed, the controller 642 controls the amount of fluid flow rate through the valve 100A.

In particular, the controller 642 can energize the solenoid coil of the solenoid actuator 146A of the valve 100A to provide fluid flow from source 604, through the first port 110A to the third port 120A, through the fluid line 637, the check valve 632, and the fluid line 626 to the first chamber 618. Further, a pilot fluid signal is provided from the fluid line 637 through the pilot fluid line 636 to the pilot port 638 of the counterbalance valve 624. When pressure of fluid discharged from the second chamber 620 along with the pressure of the pilot fluid signal at the pilot port 638 overcome the spring 639, the counterbalance valve 624 opens and allows fluid flow from the fluid line 634 to the fluid reservoir 606 via return line 644.

In this case, the solenoid actuator 146B of the valve 100B is not actuated. Thus, the valve 100B opens a fluid path from the third port 120B to the second port 114B, which is fluidly-coupled to the fluid reservoir 606, to drain the pilot fluid line 628 to the fluid reservoir 606.

During the extension operation, the controller 642 receives from the flow rate sensor 602A information indicative of the fluid flow rate through the valve 100A. The controller 642 can compare the actual fluid flow rate indicated by the flow rate sensor 602A to a target or commanded fluid flow rate that achieves the particular commanded speed. The controller 642 can then adjust the command signal (i.e., adjust the magnitude of the electric current or voltage) sent to the solenoid actuator 146A of the valve 100A to achieve the target fluid flow rate. As such, the controller 642 can implement a closed-loop feedback control system to achieve the target flow rate based on feedback signals from the flow rate sensor 602A.

Similarly, the controller 642 can receive a command or input information requesting retraction of the actuator piston 612 at a particular speed. To achieve the particular speed, the controller 642 controls the amount of fluid flow rate through the valve 100B.

In particular, the controller 642 can energize the solenoid coil of the solenoid actuator 146B of the valve 100B to provide fluid flow from source 604, through the first port 110B to the third port 120B, through the fluid line 629, the check valve 640, and the fluid line 634 to the second chamber 620. Further, a pilot fluid signal is provided from the fluid line 629 through the pilot fluid line 628 to the pilot port 630 of the counterbalance valve 622. When pressure of fluid discharged from the first chamber 618 along with the pressure of the pilot fluid signal at the pilot port 630 overcome the spring 631, the counterbalance valve 622 opens and allows fluid flow from the fluid line 626 to the fluid reservoir 606 via return line 646.

In this case, the solenoid actuator 146A of the valve 100A is not actuated. Thus, the valve 100A opens a fluid path from the third port 120A to the second port 114A, which is fluidly-coupled to the fluid reservoir 606, to drain the pilot fluid line 636 to the fluid reservoir 606.

During the retraction operation, the controller 642 receives from the flow rate sensor 602B information indicative of the fluid flow rate through the valve 100B. The controller 642 can compare the actual fluid flow rate indicated by the flow rate sensor 602B to a target or commanded fluid flow rate that achieves the particular commanded speed. The controller 642 can then adjust the command signal (i.e., adjust the magnitude of the electric current or voltage) sent to the solenoid actuator 146B of the valve 100B to achieve the target fluid flow rate. As such, the controller 642 can implement a closed-loop feedback control system to achieve the target flow rate based on feedback signals from the flow rate sensor 602B.

In conventional systems, a position sensor may be mounted to the cylinder 610 and/or the actuator piston 612 of the actuator 608 to provide an indication of the position of the actuator piston 612. However, such implementation might not be feasible, for example, in telescopic cylinders with long piston strokes. Further, such position sensor might be expensive.

In other conventional systems, a servo proportional directional control valve can be used to accurately control flow rate through the directional control valve. These valves, however, tend to be costly, and might not be suitable for all applications.

In other conventional systems, a separate flow rate sensor can be disposed in fluid lines, such as the fluid line 626 or the fluid line 634, to provide an indication of flow rate to the controller of the system. However, due to capacitance in hydraulic lines (e.g., hoses), the signal may be delayed compared to actual flow rate. Further, complexity of the system increases due to extra fluid connections to the separate flow rate sensor.

The configuration of FIG. 6 and the valve 100 with the integrated flow rate sensor may thus offer enhancements over conventional hydraulic systems. The valve 100 can be used with any type of cylinder regardless of the stroke of the piston. Further, an expensive servo proportional directional control valve is not required. Also, due to the flow rate sensor being integrated with the valve 100 where throttling occurs, any delay in the signal is reduced or eliminated, thereby enabling more accurate control of the speed and/or position of the actuator piston 612.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a plurality of ports comprising: a first port, a second port, and a third port; a spool configured to block fluid flow from the first port to the third port while allowing fluid flow from the third port to the second port when the valve is in an unactuated state; a spring applying a biasing force on the spool in a proximal direction, wherein when the valve is actuated, the spool moves in a distal direction against the spring, thereby allowing fluid flow from the first port to the third port while blocking fluid flow from the third port to the second port; and a turbine configured to rotate as fluid flows from the first port to the third port when the valve is in an actuated state.

EEE 2 is the valve of EEE 1, further comprising: a Hall Effect sensor configured to sense rotation of the turbine and provide a signal indicative of a count of revolutions of the turbine to facilitate determining fluid flow rate of fluid flowing from the first port to the third port when the valve is in the actuated state.

EEE 3 is the valve of EEE 2, wherein the turbine comprises an impeller mounted to a turbine shaft, and wherein the valve further comprises: a wheel mounted to the turbine shaft and rotatable therewith, wherein the Hall Effect sensor is mounted adjacent the wheel.

EEE 4 is the valve of EEE 3, wherein the wheel comprises magnetic material, wherein the Hall Effect sensor is configured to interact with the magnetic material of the wheel to count the revolutions of the turbine.

EEE 5 is the valve of any of EEEs 3-4, wherein the turbine shaft has a shaft portion comprising a hexagonal exterior surface, and wherein the wheel has a hexagonal interior surface to facilitate mounting the wheel to the shaft port, such that the wheel rotates with the turbine shaft.

EEE 6 is the valve of any of EEEs 1-5, further comprising: a sleeve, wherein the second port comprises a first set of cross-holes formed in the sleeve, and wherein the sleeve further comprises a second set of cross-holes, wherein the spool is axially-movable within the sleeve, wherein the spool has an annular groove configured to fluidly couple the second set of cross-holes to the first set of cross-holes when the valve is in the unactuated state, and wherein when the valve is in the actuated state, the spool moves axially such that the spool blocks the second set of cross-holes.

EEE 7 is the valve of EEE 6, wherein the sleeve comprises a third set of throttling cross-holes axially-spaced from the second set of cross-holes, and wherein when the valve is in the actuated state, the spool forms a throttling flow area with the third set of throttling cross-holes through which fluid flows from the first port to the third port.

EEE 8 is the valve of EEE 7, further comprising: a housing in which the sleeve is partially disposed, wherein the third port comprises a plurality of cross-holes formed in the housing, wherein the plurality of cross-holes of the housing are fluidly-coupled to the second set of cross-holes and the third set of throttling cross-holes of the sleeve via an annular chamber formed between the sleeve and the housing.

EEE 9 is the valve of any of EEEs 6-8, further comprising: a nose piece disposed at a distal end of the sleeve, wherein the spring is disposed between the nose piece and a distal end of the spool.

EEE 10 is the valve of any of EEEs 1-9, wherein the turbine is disposed, at least partially, within the spool, wherein the spool comprises one or more longitudinal through-holes disposed upstream of turbine and allowing fluid flow therethrough prior to fluid flowing across the turbine.

EEE 11 is the valve of any of EEEs 1-10, further comprising: a solenoid actuator having a solenoid coil and an armature, wherein when the solenoid coil is energized, the armature moves axially, thereby causing the spool to move axially therewith.

EEE 12 is the valve of EEE 11, further comprising: a rod configured to move with the armature, wherein the rod is disposed through the turbine and is coupled to the spool, such that axial movement of the armature causes the rod and the spool to move therewith.

EEE 13 is the valve of any of EEEs 1-12, wherein the turbine comprises a turbine shaft, and wherein the valve further comprises: a thrust bearing supporting the turbine shaft against axial loads and facilitating rotation of the turbine shaft.

EEE 14 is a hydraulic system comprising: an actuator comprising a first chamber and a second chamber; a source of fluid flow; a fluid reservoir; a counterbalance valve configured to control flow of fluid discharged from the second chamber to the fluid reservoir, wherein the counterbalance valve comprises a pilot port; and a valve comprising: a plurality of ports comprising: (i) a first port fluidly-coupled to the source of fluid flow, (ii) a second port fluidly-coupled to the fluid reservoir, and (iii) a third port fluidly-coupled to the first chamber of the actuator via a fluid line, wherein the pilot port of the counterbalance valve is fluidly-coupled to the fluid line, a spool configured to block fluid flow from the first port to the third port while allowing fluid flow from the third port to the second port to drain the pilot port of the counterbalance valve to the fluid reservoir when the valve is in an unactuated state, a spring applying a biasing force on the spool in a proximal direction, wherein when the valve is actuated, the spool moves in a distal direction against the spring, thereby allowing fluid flow from the first port to the third port, then to the first chamber of the actuator, while blocking fluid flow from the third port to the second port, and wherein a pilot fluid signal is provided from the fluid line to the pilot port to open the counterbalance valve and allow fluid discharged from the second chamber to flow to the fluid reservoir, and a turbine configured to rotate as fluid flows from the first port to the third port when the valve is in an actuated state.

EEE 15 is the hydraulic system of EEE 14, wherein the valve further comprises: a Hall Effect sensor configured to sense rotation of the turbine and provide a signal indicative of a count of revolutions of the turbine to facilitate determining fluid flow rate of fluid flowing from the first port to the third port.

EEE 16 is the hydraulic system of EEE 15, wherein the turbine comprises an impeller mounted to a turbine shaft, and wherein the valve further comprises: a wheel mounted to the turbine shaft and rotatable therewith, wherein the Hall Effect sensor is mounted adjacent the wheel.

EEE 17 is the hydraulic system of EEE 16, wherein the wheel comprises magnetic material, wherein the Hall Effect sensor is configured to interact with the magnetic material of the wheel to count the revolutions of the turbine.

EEE 18 is the hydraulic system of any of EEEs 15-17, further comprising: a controller configured to perform operations comprising: receiving sensor information from the Hall Effect sensor to determine actual fluid flow rate from the first port to the third port; comparing the actual fluid flow rate to a target fluid flow rate; and based on the comparing, providing an actuation signal to the valve to achieve the target fluid flow rate.

EEE 19 is the hydraulic system of EEE 18, wherein the valve further comprises: a solenoid actuator having a solenoid coil and an armature, wherein when the solenoid coil is energized, the armature moves axially, thereby causing the spool to move axially therewith, and wherein providing the actuation signal to the valve to achieve the target fluid flow rate comprises: providing the actuation signal to the solenoid coil of the solenoid actuator.

EEE 20 is the hydraulic system of any of EEEs 18-19, wherein the controller is configured to perform further operations comprising: receiving a commanded speed for the actuator; and determining the target fluid flow rate based on the commanded speed.

What is claimed is:

1. A valve comprising:
   a plurality of ports comprising: a first port, a second port, and a third port;
   a spool configured to block fluid flow from the first port to the third port while allowing fluid flow from the third port to the second port when the valve is in an unactuated state;
   a spring applying a biasing force on the spool in a proximal direction, wherein when the valve is actuated, the spool moves in a distal direction against the spring, thereby allowing fluid flow from the first port to the third port while blocking fluid flow from the third port to the second port; and
   a turbine configured to rotate as fluid flows from the first port to the third port when the valve is in an actuated state.

2. The valve of claim 1, further comprising:
   a Hall Effect sensor configured to sense rotation of the turbine and provide a signal indicative of a count of revolutions of the turbine to facilitate determining fluid flow rate of fluid flowing from the first port to the third port when the valve is in the actuated state.

3. The valve of claim 2, wherein the turbine comprises an impeller mounted to a turbine shaft, and wherein the valve further comprises:
   a wheel mounted to the turbine shaft and rotatable therewith, wherein the Hall Effect sensor is mounted adjacent the wheel.

4. The valve of claim 3, wherein the wheel comprises magnetic material, wherein the Hall Effect sensor is configured to interact with the magnetic material of the wheel to count the revolutions of the turbine.

5. The valve of claim 3, wherein the turbine shaft has a shaft portion comprising a hexagonal exterior surface, and wherein the wheel has a hexagonal interior surface to facilitate mounting the wheel to the shaft port, such that the wheel rotates with the turbine shaft.

6. The valve of claim 1, further comprising:
   a sleeve, wherein the second port comprises a first set of cross-holes formed in the sleeve, and wherein the sleeve further comprises a second set of cross-holes, wherein the spool is axially-movable within the sleeve, wherein the spool has an annular groove configured to fluidly couple the second set of cross-holes to the first set of cross-holes when the valve is in the unactuated state, and wherein when the valve is in the actuated state, the spool moves axially such that the spool blocks the second set of cross-holes.

7. The valve of claim 6, wherein the sleeve comprises a third set of throttling cross-holes axially-spaced from the second set of cross-holes, and wherein when the valve is in the actuated state, the spool forms a throttling flow area with the third set of throttling cross-holes through which fluid flows from the first port to the third port.

8. The valve of claim 7, further comprising:
   a housing in which the sleeve is partially disposed, wherein the third port comprises a plurality of cross-holes formed in the housing, wherein the plurality of cross-holes of the housing are fluidly-coupled to the second set of cross-holes and the third set of throttling cross-holes of the sleeve via an annular chamber formed between the sleeve and the housing.

9. The valve of claim 6, further comprising:
   a nose piece disposed at a distal end of the sleeve, wherein the spring is disposed between the nose piece and a distal end of the spool.

10. The valve of claim 1, wherein the turbine is disposed, at least partially, within the spool, wherein the spool comprises one or more longitudinal through-holes disposed upstream of turbine and allowing fluid flow therethrough prior to fluid flowing across the turbine.

11. The valve of claim 1, further comprising:
    a solenoid actuator having a solenoid coil and an armature, wherein when the solenoid coil is energized, the armature moves axially, thereby causing the spool to move axially therewith.

12. The valve of claim 11, further comprising:
    a rod configured to move with the armature, wherein the rod is disposed through the turbine and is coupled to the spool, such that axial movement of the armature causes the rod and the spool to move therewith.

13. The valve of claim 1, wherein the turbine comprises a turbine shaft, and wherein the valve further comprises:
    a thrust bearing supporting the turbine shaft against axial loads and facilitating rotation of the turbine shaft.

14. A hydraulic system comprising:
    an actuator comprising a first chamber and a second chamber;
    a source of fluid flow;
    a fluid reservoir;
    a counterbalance valve configured to control flow of fluid discharged from the second chamber to the fluid reservoir, wherein the counterbalance valve comprises a pilot port; and
    a valve comprising:
      a plurality of ports comprising: (i) a first port fluidly-coupled to the source of fluid flow, (ii) a second port fluidly-coupled to the fluid reservoir, and (iii) a third port fluidly-coupled to the first chamber of the actuator via a fluid line, wherein the pilot port of the counterbalance valve is fluidly-coupled to the fluid line,
      a spool configured to block fluid flow from the first port to the third port while allowing fluid flow from the third port to the second port to drain the pilot port of the counterbalance valve to the fluid reservoir when the valve is in an unactuated state,
      a spring applying a biasing force on the spool in a proximal direction, wherein when the valve is actuated, the spool moves in a distal direction against the spring, thereby allowing fluid flow from the first port to the third port, then to the first chamber of the actuator, while blocking fluid flow from the third port to the second port, and wherein a pilot fluid signal is provided from the fluid line to the pilot port to open the counterbalance valve and allow fluid discharged from the second chamber to flow to the fluid reservoir, and
      a turbine configured to rotate as fluid flows from the first port to the third port when the valve is in an actuated state.

15. The hydraulic system of claim 14, wherein the valve further comprises:
    a Hall Effect sensor configured to sense rotation of the turbine and provide a signal indicative of a count of revolutions of the turbine to facilitate determining fluid flow rate of fluid flowing from the first port to the third port.

16. The hydraulic system of claim 15, wherein the turbine comprises an impeller mounted to a turbine shaft, and wherein the valve further comprises:
a wheel mounted to the turbine shaft and rotatable therewith, wherein the Hall Effect sensor is mounted adjacent the wheel.

17. The hydraulic system of claim 16, wherein the wheel comprises magnetic material, wherein the Hall Effect sensor is configured to interact with the magnetic material of the wheel to count the revolutions of the turbine.

18. The hydraulic system of claim 15, further comprising:
a controller configured to perform operations comprising:
receiving sensor information from the Hall Effect sensor to determine actual fluid flow rate from the first port to the third port;
comparing the actual fluid flow rate to a target fluid flow rate; and
based on the comparing, providing an actuation signal to the valve to achieve the target fluid flow rate.

19. The hydraulic system of claim 18, wherein the valve further comprises:
a solenoid actuator having a solenoid coil and an armature, wherein when the solenoid coil is energized, the armature moves axially, thereby causing the spool to move axially therewith, and wherein providing the actuation signal to the valve to achieve the target fluid flow rate comprises:
providing the actuation signal to the solenoid coil of the solenoid actuator.

20. The hydraulic system of claim 18, wherein the controller is configured to perform further operations comprising:
receiving a commanded speed for the actuator; and
determining the target fluid flow rate based on the commanded speed.

* * * * *